United States Patent Office 3,061,556
Patented Oct. 30, 1962

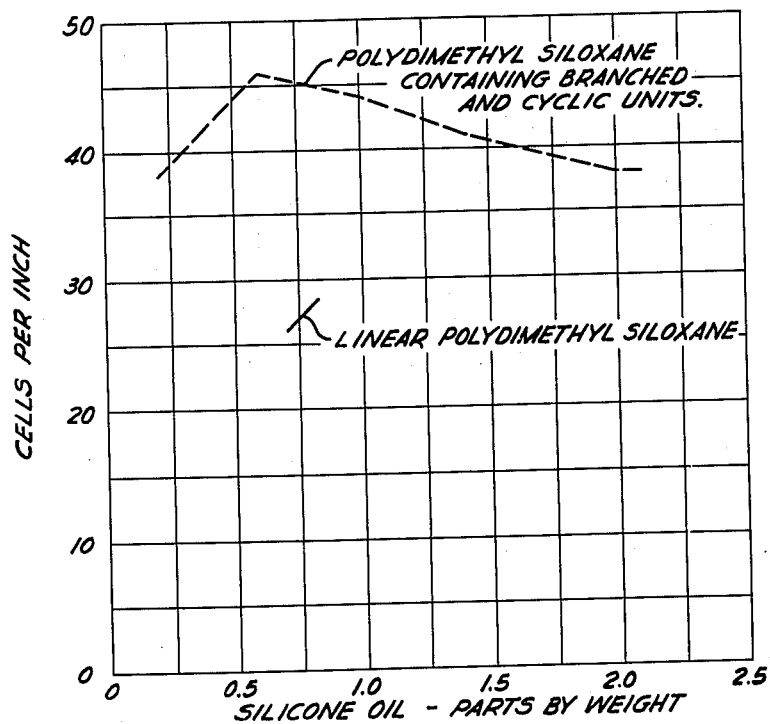

3,061,556
PREPARATION OF CELLULAR POLY-
URETHANE PLASTICS
Paul G. Gemeinhardt, Sistersville, W. Va., assignor to Mobay Chemical Company, Pittsburgh, Pa., a corporation of Delaware
Filed Aug. 20, 1959, Ser. No. 835,112
7 Claims. (Cl. 260—2.5)

This invention relates to an improved process for the manufacture of cellular polyurethane plastics from isocyanate-modified polyhydric polyalkylene ethers. More particularly, this invention relates to improved stabilizers for the reaction between water, an organic polyisocyanate and an isocyanate-modified polyhydric polyalkylene ether.

In making cellular polyurethane plastics, it has been found advantageous to employ a silicone oil to control the cell size of the resulting porous plastic. However, silicone oil is not used in all cases for the same purpose. Where cellular polyurethane plastics are produced from hydroxyl polyesters, water and organic polyisocyanates, the silicone oil may be incorporated into the reaction mixture in trace quantities, whereupon it performs its expected function and operates as a defoaming agent to enlarge the cell size of the resulting cellular polyurethane plastic. Where the cellular polyurethane plastics are prepared from polyhydric polyalkylene ethers, water and organic polyisocyanates in a one-step process, it has been found necessary to use a silicone oil which contains some mixed oxyalkylene block copolymers in the molecule. The silicone oils employed in the one-step process for obtaining cellular polyurethane plastics from polyhydric polyalkylene ethers perform in an unexpected manner to increase the foamability of the reaction mixture resulting in a more satisfactory cell size.

Silicone oils have also been used in the preparation of polyether base cellular polyurethane plastics from the reaction of water and an organic polyisocyanate-modified polyhydric polyalkylene ether having terminal —NCO groups. For this reaction a substantially linear polydimethyl siloxane containing not more than about 0.2 percent to about 0.4 percent siloxane side chains has been used. The use of the substantially linear silicone oils in the production of cellular polyurethane plastics based on isocyanate-modified polyhydric polyalkylene ethers has suffered from the disadvantage that only a very narrow range of silicone oil concentration will produce satisfactory stabilization of the foaming reaction. In other words, it has been found that very low concentrations of silicone oil ranging from about 0.4 to about 1.0 part by weight per 100 parts of reaction mixture will produce a satisfactory stabilization of the foaming reaction. This narrow range makes the foaming of isocyanate-modified polyhydric polyalkylene ethers difficult in many instances because of the careful control which must be exercised over the proportion of silicone oil to the total amount of reactants employed.

It is an object of this invention to provide an improved process for the preparation of cellular polyurethane plastics. Another object of this invention is to provide an improved process for the preparation of a cellular polyurethane plastic from an isocyanate-modified polyhydric polyalkylene ether. Still another object of this invention is to broaden the permissible range of concentration of silicone oil which may be employed to stabilize the foaming reaction resulting from the reaction between water and an isocyanate-modified polyhydric polyalkylene ether. Another object of this invention is to provide novel foam stabilizers for cellular polyurethane plastics.

The foregoing objects and others which will become apparent from the following description and the accompanying drawing are accomplished in accordance with this invention, generally speaking, by providing a process for the preparation of a cellular polyurethane plastic which comprises reacting water and an organic polyisocyanate-modified polyhydric polyalkylene ether while in admixture with a branched and/or cyclic silicone oil prepared from reactants containing about 0.5 mol percent to about 15 mol percent trihalo alkyl silane. Thus, this invention contemplates a process for the preparation of a cellular polyurethane plastic by a process which comprises mixing from about 0.1 to about 5 parts by weight of a branched and/or cyclic silicone oil prepared from reactants containing about 0.5 mol percent to about 15 mol percent trihalo alkyl silane and having a viscosity within the range of from about 5 to about 500 centistokes at 25° C., with water and an isocyanate-modified polyhydric polyalkylene ether obtained from an organic polyisocyanate and a polyhydric polyalkylene ether having from 2 to 4 hydroxyl groups and obtained from the condensation of alkylene oxides or alkylene oxides with water or with dihydric, trihydric and/or tetrahydric alcohols.

The drawing is a line graph comparing the operable concentration ranges for a substantially linear polydimethyl siloxane and a silicone oil containing branched and/or cyclic silicone oils as specified above.

Any suitable silicone oil prepared from reactants containing about 0.5 mol percent to about 15 mol percent trihalo alkyl silane may be employed in accordance with the process of the present invention to increase the concentration range over which the silicone oil will effectively stabilize the foaming reaction resulting from the combination of water and an organic polyisocyanate-modified polyhydric polyalkylene ether. The silicone oil preferably has a viscosity within the range of from about 5 to about 500 centistokes at 25° C. The trihalo alkyl silanes may be, for example, trichloro, tribromo, trifluoro and the like alkyl silanes. Any suitable alkyl radical may be the alkyl substituent, but lower alkyl radicals such as methyl, ethyl and propyl are preferred. It is preferred to employ a silicone oil prepared from reactants containing about 2 mol percent to about 10 mol percent trichloro alkyl silane and best results are obtained employing from about 4 mol percent to about 6 mol percent trichloro methyl silane. The silicone oils prepared from reactants containing trihalo alkyl silane in addition to dihalo dialkyl silane may therefore exist as mixtures of linear, cyclic and branched siloxanes or silicone oils containing cyclic and branched units in the chain. While the viscosity of the silicone oil may be varied over a wide range and preferably within the range of from about 5 to about 500 centistokes at 25° C., best results are obtained when the viscosity is within the range of from about 10 to about 50 cts. at 25° C.

Any suitable organic polyisocyanate may be used in the preparation of the organic polyisocyanate-modified polyhydric polyalkylene ether. Representative examples of polyisocyanates which may be used are arylene diisocyanate such as, for example, phenylene diisocyanate, p,p′-diphenyl methane diisocyanate, toluylene diisocyanate, and particularly mixtures of 2,4-toluylene diisocyanate and 2,6-toluylene diisocyanate, most advantageous results being obtained from a mixture of 80 percent 2,4-toluylene diisocyanate and 20 percent 2,6-toluylene diisocyanate, alkylene diisocyanates such as, for example, hexamethylene diisocyanate as well as other suitable organic polyisocyanates disclosed in United States Reissue Patent 24,514 to Hoppe et al., issued August 12, 1958.

Any suitable polyhydric polyalkylene ether may be used. Polyhydric polyalkylene ethers having from 2 to 4 hydroxyl groups are preferred. Suitable polyhydric polyalkylene ethers may be obtained from the condensation of an alkylene oxide such as, for example, ethylene oxide, propylene oxide, butylene oxide, amylene oxide and the like or such alkylene oxides with a small amount of an hydroxyl containing material such as, for example, water or a polyhydric alcohol such as, for example, ethylene glycol, 1,3-propylene glycol, 1,4-butane diol, trimethylol propane, glycerol, 1,3,6-hexane triol, pentaerythritol, N,N,N',N' tetrakis (2-hydroxy propyl) ethylene diamine and the like.

Any suitable polyhydric polyalkylene ether may be used as stated above, but it is preferred to employ polyhydric polyalkylene ethers having a molecular weight of at least about 500 and more preferably within the range of from about 500 to about 10,000 and most preferably within the range of about 1,000 to 5,000 and having an hydroxyl number of from about 25 to about 225 and preferably from about 50 to about 150. The polyhydric polyalkylene ethers employed in the process of the invention may be prepared by any known process, such as, for example, the process disclosed by Wurtz in 1859 and in "Encyclopedia of Chemical Technology," vol. 7, pages 257–262, published by Interscience Publishers, Inc., 1951, or in U.S. Patent 1,922,459.

In carrying out the process of the present invention, the isocyanate-modified polyhydric polyalkylene ether is prepared in a first step under substantially anhydrous conditions and then mixed with water and the branched and/or cyclic silicone oil and allowed to react to form a cellular polyurethane plastic. It is preferred to carry out the reaction with water in the presence of a tertiary amine catalyst such as, for example, triethyl amine, N,N'-dimethyl piperazine, N,N'-diethyl piperazine, triethylene diamine, N-ethyl morpholine, N-methyl morpholine, dimethyl cetyl amine, methyl dilauryl amine, dilauryl amine and the like. Further, the process of the invention is advantageously carried out employing a mixer for the components of the cellular polyurethane plastic such as is disclosed, for example, in United States Reissue Patent 24,514 to Hoppe et al., issued August 12, 1958. Suitable reaction conditions and the like may be found in the aforementioned patent.

All or part of the water used to produce the cellular structure of the polyurethane plastic may be replaced with a chemically inert blowing agent, such as, for example, dichlorodifluoromethane or other suitable blowing agent according to the process disclosed and using the blowing agents disclosed in French Patent 1,161,239 to General Tire and Rubber Co., issued August 25, 1958.

The cellular polyurethane plastics produced in accordance with this invention may be either rigid, semi-rigid, or flexible. They may be used as either thermal or sound insulation, for cushions, crash pads for automobiles, shoe soles, carpet underlay, upholstery and the like.

The drawing indicates the broadened range of branched and/or cyclic silicone oil prepared from reactants containing about 0.5 mol percent to about 15 mol percent trichloro methyl silane as compared to a substantially linear polydimethyl siloxane prepared from reactants containing up to 0.4 mol percent trichloro methyl silane. In the graph, the solid line indicates the permissible range of concentration of the silicone oil prepared from reactants containing up to 0.4 mol percent trichloro methyl silane which will produce a satisfactory stabilization of the foaming reaction while the dotted line indicates the permissible concentration of silicone oil prepared from reactants containing 0.5 mol percent to about 15 mol percent trichloro methyl silane. Concentrations below the minimum amount of linear siloxane result in boiling without formation of a satisfactory cellular structure. Concentrations of the linear siloxane above the maximum amount shown will stabilize the rise of the foaming mixture but the cellular structure will thereafter collapse yielding only a horny unusable mass.

In order to better describe and further clarify the invention, the following are specific embodiments in which the parts are by weight.

Example 1

An isocyanate-modified polyhydric polyalkylene ether was prepared by the reaction of a mixture of about 60 parts of a polypropylene ether glycol having a molecular weight of about 2000 and an hydroxyl number of about 56 with about 40 parts by weight of a trihydric polyalkylene ether obtained from the reaction of about 1 part of glycerine with about 30 parts of propylene oxide condensed to a molecular weight of about 3000 and having an hydroxyl number of about 56 with about 12.5 parts of a mixture of 80 percent 2,4-toluylene diissocyanate and 20 percent 2,6-toluylene diisocyanate in a first addition until the temperature had risen to about 115° C. Then in a second step, an additional 27.5 parts of the 80:20 mixture of toluylene diisocyanates were added to the reaction product of the first step and allowed to cool to room temperature. At this point, the isocyanate-modified polyhydric polyalkylene ether had a viscosity of about 8500 cps./25° C. and the free —NCO content was about 10.3 percent. To 100 parts of this isocyanate-modified polyhydric polyalkylene ether was added, about 0.3 part of triethylamine, about 3 parts of N-ethyl morpholine, about 2.2 parts water and about 0.2 part of a polydimethyl siloxane prepared from reactants containing about 4 mol percent trichloro methyl silane and having a viscosity of about 10 cts. at 25° C. The reactants were combined in a machine mixer as disclosed in United States Reissue Patent 24,514, issued August 12, 1958, to Hoppe et al.

The resulting cellular polyurethane plastic had the following physical properties:

Tensile strength (lbs./in.$^2$) _____ 18–20
Density (lbs./ft.$^3$) _____ 2
Elongation at break (percent) _____ 280–300
Compression deflection (lbs./in.$^2$) _____ 0.40 at 25% R
Compression set (percent) _____ 10
Cell size, no./in. _____ 35

Example 2

To 100 parts of the isocyanate-modified polyhydric polyalkylene ether prepared in accordance with the process of Example 1 are added about 0.3 part triethyl amine, 3 parts N-ethyl morpholine, 2.2 parts water and 4.5 parts of a silicone oil prepared from reactants containing about 4 mol percent trichloro methyl silane and having a viscosity of about 10 cts. at 25° C. The reactants were combined in a machine mixer as disclosed in United States Reissue Patent 24,514, issued August 12, 1958, to Hoppe et al.

The resulting cellular polyurethane plastic had the following physical properties:

Tensile strength (lbs./in.$^2$) _____ 18–20
Density (lbs./ft.$^3$) _____ 2
Elongation at break (percent) _____ 280–300
Compression deflection (lbs./in.$^2$) _____ 0.40 at 25% R
Compression set (percent) _____ 10
Cell size, no./in. _____ 45

Example 3

To about 100 parts of the isocyanate-modified polyhydric polyalkylene ether prepared in accordance with Example 1 was added about 0.3 part triethylamine, 3 parts ethylmorpholine, 2.2 parts water and 0.2 part of a silicone oil prepared from reactants containing about 6 mol percent of trichloro methyl silane and having a viscosity of about 10 cts. at 25° C. The reactants were combined in a machine mixer as disclosed in United States Reissue Patent 24,514, issued August 12, 1958, to Hoppe et al.

The resulting cellular polyurethane plastic had the following physical properties:

Tensile strength (lbs./in.²) _____ 18–20
Density (lbs./ft.³) _____ 2
Elongation at break (percent) _____ 280–300
Compression deflection (lb./in.²) _____ 0.4 at 25% R
Compression set (percent) _____ 10
Cell size, no./in. _____ 35

Example 4

To about 100 parts of the isocyanate-modified polyhydric polyalkylene ether prepared in accordance with Example 1 was added about 0.3 part triethylamine, 3 parts ethylmorpholine, 2.2 parts water and 4.5 parts of a silicone oil prepared from reactants containing about 6 mol percent of trichloro methyl silane and having a viscosity of about 10 cts. at 25° C. The reactants were combined in a machine mixer as disclosed in United States Reissue Patent 24,514, issued August 12, 1958, to Hoppe et al.

The resulting cellular polyurethane plastic had the following physical properties:

Tensile strength (lbs./in.²) _____ 18–20
Density (lbs./ft.³) _____ 2
Elongation at break (percent) _____ 280–300
Compression deflection (lbs./in.²) _____ 0.40 at 25% R
Compression set (percent) _____ 10
Cell size, no./in. _____ 35

Example 5

An isocyanate-modified polyhydric polyalkylene ether was prepared by reacting about 100 parts of a polypropylene ether glycol having a molecular weight of about 2000 and an hydroxyl number of about 56 with about 28 parts of a mixture containing 80 percent 2,4-toluylene diisocyanate and 20 percent 2,6-toluylene diisocyanate until a viscosity of about 12,000 cps. at 25° C. and a free —NCO content of about 6.8 percent was reached. 100 parts by weight of this isocyanate-modified polyhydric polyalkylene ether was then mixed with about 0.2 part of a silicone oil prepared from reactants containing about 4 mol percent trichloro methyl silane and having a viscosity of about 10 cts. at 25° C. The reactants were combined in a machine mixer as disclosed in United States Reissue Patent 24,514, issued August 12, 1958, to Hoppe et al.

The resulting cellular polyurethane plastic had the following physical properties:

Tensile strength (lb./in.²) _____ 23–25
Density (lbs./ft.³) _____ 2
Elongation at break (percent) _____ 350–400
Compression deflection (lbs./in.²) _____ 0.30 at 25% R
Compression set (percent) _____ 10
Cell size, no./in. _____ 35

Example 6

About 100 parts of the isocyanate-modified polyhydric polyalkylene ether prepared in accordance with the process of Example 5 was combined with about 0.2 part ethylmorpholine, 2.2 parts water and 2.0 parts by weight of a silicone oil prepared from reactants containing about 4 mol percent trichloro methyl silane and having a viscosity of about 10 cts. at 25° C. The reactants were combined in a machine mixer as disclosed in United States Reissue Patent 24,514, issued August 12, 1958 to Hoppe et al.

The resulting cellular polyurethane plastic had the following physical properties:

Tensile strength (lb./in.²) _____ 23–25
Density (lbs./ft.³) _____ 2
Elongation at break (percent) _____ 350–400
Compression deflection (lbs./in.²) _____ 0.3 at 25% R
Compression set (percent) _____ 10
Cell size, no./in. _____ 45

Example 7

About 100 parts by weight of the isocyanate-modified polyhydric polyalkylene ether prepared in accordance with the process of Example 5 was combined with about 0.2 part ethylmorpholine, 2.2 parts water and 0.2 part of a silicone oil prepared from reactants containing about 6 mol percent trichloro methyl silane and having a viscosity of about 10 cts. at 25° C. The reactants were combined in a machine mixer as disclosed in United States Reissue Patent 24,514, issued August 12, 1958, to Hoppe et al.

The resulting cellular polyurethane plastic had the following physical properties:

Tensile strength (lbs./in.²) _____ 23–25
Density (lbs./ft.³) _____ 2
Elongation at break (percent) _____ 350–400
Compression deflection (lbs./in.²) _____ 0.3 at 25% R
Compression set (percent) _____ 10
Cell size, no./in. _____ 35

Example 8

About 100 parts by weight of the isocyanate-modified polyhydric polyalkylene ether prepared in accordance with the process of Example 5 was combined with about 0.2 part ethylmorpholine, 2.2 parts water and 2.1 parts of a silicone oil prepared from reactants containing about 6 mol percent trichloromethyl silane and having a viscosity of about 10 cts. at 25° C. The reactants were combined in a machine mixer as disclosed in United States Reissue Patent 24,514, issued August 12, 1958, to Hoppe et al.

The resulting cellular polyurethane plastic had the following physical properties:

Tensile strength (lbs./in.²) _____ 23–25
Density (lbs./ft.³) _____ 2
Elongation at break (percent) _____ 350–400
Compression deflection (lbs./in.²) _____ 0.3 at 25% R
Compression set (percent) _____ 10
Cell size, no./in. _____ 45

Although the foregoing examples utilize particular silicone oils prepared from reactants containing about 4 to about 6 mol percent trichloro methyl silane, it is to be understood that any other suitable silicone oil containing the above-described siloxane side chains and/or cyclic structures could have been used with equally satisfactory results. Further, any other suitable organic polyisocyanate and/or polyhydric polyalkylene ether, catalyst and the like could have been used in the foregoing examples with equally satisfactory results.

Although the invention has been described in considerable detail in the foregoing for the purpose of illustration, it is to be understood that such detail is solely for this purpose and that variations can be made therein by those skilled in the art without departing from the spirit and scope of the invention except as is set forth in the claims.

What is claimed is:

1. In the manufacture of cellular polyurethane plastics by a process which comprises reacting water with an organic polyisocyanate-modified polyhydric polyalkylene ether containing terminal —NCO groups, said polyhydric polyalkylene ether having from 2 to 4 hydroxyl groups, the improvement which comprises mixing said water and said polyisocyanate-modified polyhydric polyalkylene ether with from about 0.1 to about 5 parts by weight of a poly di(lower alkyl) siloxane prepared from reactants containing a dihalo dialkyl silane and from about 0.5 mol percent to about 15 mol percent trihalo lower alkyl silane.

2. The process of claim 1 wherein said trihalo alkyl silane concentration is from about 2 mol percent to about 10 mol percent.

3. The process of claim 1 wherein said trihalo alkyl silane concentration is from about 4 mol percent to about 6 mol percent.

4. In the manufacture of cellular polyurethane plastics by a process which comprises reacting a polyhydric polyalkylene ether having from 2 to 4 hydroxyl groups with an excess of an organic polyisocyanate in a first step to prepare an isocyanate-modified prepolymer having terminal —NCO groups and reacting said isocyanate-modified prepolymer with water in a second step to prepare said cellular polyurethane plastic, the improvement which comprises mixing said isocyanate-modified polyhydric polyalkylene ether and water with from about 0.2 to about 5 parts by weight of a polydimethyl siloxane having a viscosity within the range of from about 5 to about 500 centistokes at 25° C. and prepared from reactants containing from about 0.5 mol percent to about 15 mol percent trichloro lower alkyl silane and allowing the mixed reactants to react to form a cellular polyurethane plastic.

5. The process of claim 4 wherein said polydimethyl siloxane has a viscosity within the range of from about 5 to about 20 centistokes at 25° C.

6. The process of claim 4 wherein said polydimethyl siloxane is prepared from reactants containing from about 2 to about 10 mol percent of trichloro alkyl silane.

7. The process of claim 4 wherein said polydimethyl siloxane is prepared from reactants containing from about 2 to about 10 mol percent of trichloro methyl silane.

References Cited in the file of this patent

UNITED STATES PATENTS

| | | |
|---|---|---|
| 2,258,218 | Rochow | Oct. 7, 1941 |
| 2,901,445 | Harris | Aug. 25, 1959 |